US011674383B2

(12) United States Patent
Wang et al.

(10) Patent No.: US 11,674,383 B2
(45) Date of Patent: Jun. 13, 2023

(54) ACOUSTIC BEAMFORMING TECHNIQUES WITH SIMULTANEOUS ACOUSTIC VELOCITY ESTIMATION

(71) Applicant: Halliburton Energy Services, Inc., Houston, TX (US)

(72) Inventors: Yadong Wang, Singapore (SG); Yao Ge, Singapore (SG); Xiang Wu, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 353 days.

(21) Appl. No.: 17/088,386

(22) Filed: Nov. 3, 2020

(65) Prior Publication Data

US 2022/0136385 A1    May 5, 2022

(51) Int. Cl.
*E21B 47/107* (2012.01)
*E21B 47/117* (2012.01)
(Continued)

(52) U.S. Cl.
CPC .......... *E21B 47/117* (2020.05); *E21B 47/107* (2020.05); *G01V 1/186* (2013.01); *G01V 1/50* (2013.01)

(58) Field of Classification Search
CPC .......... E21B 47/107; G01V 1/40; G01V 1/44; G01V 1/46; G01V 1/48; G01V 1/50
See application file for complete search history.

(56) References Cited

U.S. PATENT DOCUMENTS

| 5,771,170 A * | 6/1998 | Withers .................. G01V 1/42 |
| | | 702/14 |
| 2013/0322209 A1* | 12/2013 | Khadhraoui ........... G01V 1/303 |
| | | 367/25 |

(Continued)

FOREIGN PATENT DOCUMENTS

WO    2018088998 A1    5/2018

OTHER PUBLICATIONS

PCT Application Serial No. PCT/US2020/058902; International Search Report; dated Aug. 2, 2021, 3 pages.
(Continued)

*Primary Examiner* — Kipp C Wallace
(74) *Attorney, Agent, or Firm* — Delizio, Peacock, Lewin & Guerra

(57) ABSTRACT

A hydrophone array tool as described herein is configured to locate leakages throughout a borehole with improved accuracy using acoustic beamforming techniques with acoustic velocity estimation. An acoustic beamforming processor generates an initial beamforming map and corresponding initial estimated leakage location using acoustic measurements throughout the borehole. The acoustic beamforming processor generates additional beamforming maps at the initial estimated leakage location, each additional beamforming map corresponding to an acoustic velocity within a range of anticipated acoustic velocities. An acoustic velocity estimator determines an acoustic velocity corresponding to a beamforming map with spatial statistics that indicate a most prominent leakage location. The acoustic beamforming processor updates the leakage location according to this beamforming map for improved accuracy.

20 Claims, 8 Drawing Sheets

(51) Int. Cl.
*G01V 1/18* (2006.01)
*G01V 1/50* (2006.01)

(56) References Cited

U.S. PATENT DOCUMENTS

| | | | |
|---|---|---|---|
| 2016/0258281 A1* | 9/2016 | Mandal | E21B 47/09 |
| 2017/0184751 A1 | 6/2017 | Ang et al. | |
| 2017/0269243 A1* | 9/2017 | Jagannathan | E21B 47/107 |
| 2017/0350235 A1* | 12/2017 | Christofi | G01V 1/48 |
| 2018/0100950 A1 | 4/2018 | Yao et al. | |
| 2018/0258756 A1* | 9/2018 | Nguyen | G01V 1/46 |
| 2018/0355712 A1 | 12/2018 | Nguyen et al. | |
| 2019/0203585 A1 | 7/2019 | Nguyen et al. | |
| 2022/0381139 A1* | 12/2022 | Cerrahoglu | E21B 47/113 |

OTHER PUBLICATIONS

PCT Application Serial No. PCT/US2020/058902; International Written Opinion; dated Aug. 2, 2021, 5 pages.
"Acoustic Conformance Xaminer® (ACX™) Service", [online] retrieved on Aug. 31, 2020 from https://www.halliburton.com/content/dam/ps/public/Ip/contents/Data_Sheets/web/H/Acoustic-Conformance-Xaminer.pdf.
Frost, et al., "An Algorithm for Linearly Constrained Adaptive Array Processing", Proceedings of the IEEE, vol. 60, Issue: 8, Aug. 1972,, 10 pages.
Hamid, et al., "Performance Comparison of Time-Domain and Frequency-Domain Beamforming Techniques for Sensor Array Processing", Proceedings of 2014 11th International Bhurban Conference on Applied Sciences & Technology (IBCAST), Islamabad, Pakistan, Jan. 14-18, 2014, 7 pages.
Inagaki, et al., "Sound Velocity Estimation and Beamform Correction by Simultaneous Multimodality Imaging with Ultrasound and Magnetic Resonance", Applied Sciences; Basel vol. 8, Iss. 11, Nov. 2018, 11 pages.
Mars, et al., "Beamforming Techniques Using Microphone Arrays", Academic Press Library in Signal Processing, vol. 7, Ch. 12, Array, Radar and Communications Engineering, 2018, pp. 585-612.

* cited by examiner

ACOUSTIC BEAMFORMING TECHNIQUES WITH SIMULTANEOUS ACOUSTIC VELOCITY ESTIMATION

TECHNICAL FIELD

The disclosure generally relates to the field of acoustic signal processing, and more particularly to beamforming to detect the location of an acoustic source in downhole operations.

BACKGROUND

Beamforming is a technique for determining the location of an acoustic source based on signals for the acoustic source detected from an array of sensors. Acoustic beamforming techniques apply to source estimation from a waveform in scenarios in which the waveform is an acoustic source and a linear array of acoustic sensors are configured to detect acoustic measurements of the waveform. In downhole wireline operations, leakages which emit acoustic waveforms occur in a tubing or casing or other downhole equipment that allow borehole fluids to leak inside the tubing or casing. Linear hydrophone arrays deployed in the wireline take acoustic measurements of acoustic waveforms from the leakages. The location of the leakages can be estimated using acoustic beamforming techniques on the acoustic measurements. Acoustic beamforming techniques generate a 2D beamforming map in radial and depth directions around the sensors in the borehole. The beamforming map indicates likelihoods that each of a set of locations (e.g., in a grid) in the 2D beamforming map is the location of a leakage. Acoustic beamforming techniques assume an acoustic velocity and predict likelihood values for the location of an acoustic source using the assumed acoustic velocity.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that embody embodiments of the disclosure. However, it is understood that this disclosure may be practiced without these specific details. For instance, this disclosure refers to acoustic beamforming using acoustic velocity estimations in illustrative examples. Embodiments of this disclosure can be instead applied to beamforming for radar measurements, sonar measurements, wireless communications, etc. In other instances, well-known instruction instances, protocols, structures, and techniques have not been shown in detail in order not to obfuscate the description.

Overview

A hydrophone array tool locates leakage in the tubing or casing of a borehole in a wireline operation using acoustic beamforming techniques with estimation of acoustic velocity. First, a linear array of acoustic sensors in the hydrophone array tool collects acoustic measurements throughout the borehole and sends the acoustic measurements to a device programmed to perform acoustic beamforming techniques (hereinafter "acoustic beamforming processor"). The acoustic beamforming processor uses an acoustic beamforming technique to generate an initial beamforming map. The acoustic beamforming processor detects an initial estimated leakage location in the tubing or casing using likelihood values in the initial beamforming map. In a second beamforming step, a set of anticipated acoustic velocities are generated by or provided to the acoustic beamforming processor that are within a reasonable range of acoustic velocities for the expected operational conditions downhole. From additional acoustic measurements or the acoustic measurements originally taken by the hydrophone array tool, the acoustic beamforming processor generates multiple beamforming maps, each beamforming map for a different acoustic velocity within the set of anticipated acoustic velocities. An acoustic velocity estimator evaluates spatial statistics of the beamforming maps for each acoustic velocity against a statistical criterion to determine an estimated acoustic velocity corresponding to a beamforming map with a most prominent leakage location. The acoustic beamforming processor uses the beamforming map corresponding to the estimated acoustic velocity as an updated beamforming map to determine an updated estimated leakage location with improved accuracy.

Example Illustrations

Figure 1:
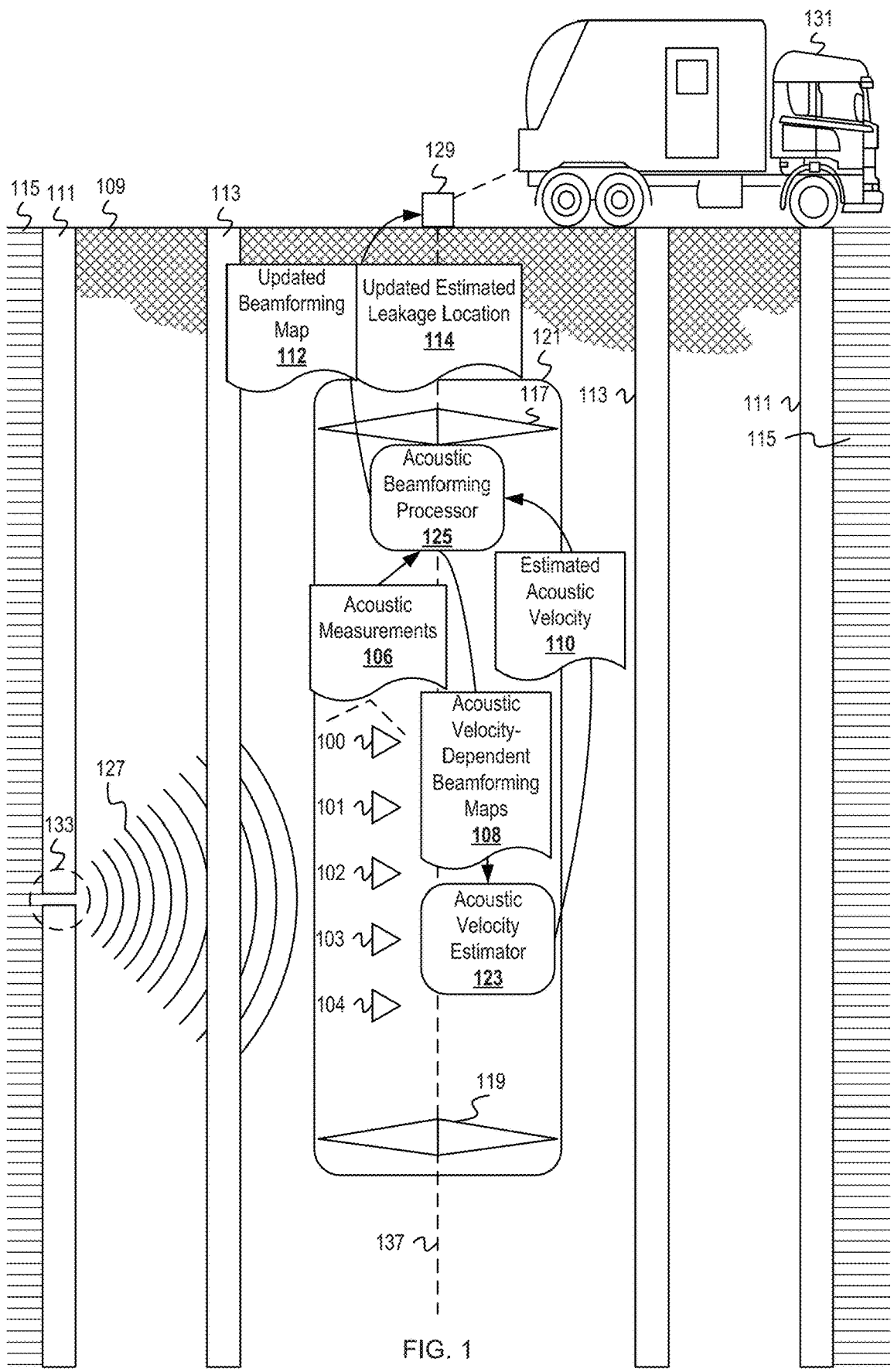
FIG. 1 is a schematic diagram of a wireline tool system with a hydrophone array tool for detecting leakage using acoustic beamforming techniques with acoustic velocity estimation.

FIG. 1 is a schematic diagram of a wireline system with a hydrophone array tool for detecting leakage using acoustic beamforming with acoustic velocity estimation. A hydrophone array tool 121 is deployed in a borehole comprising a tubing 113 surrounded by a casing 111 that isolates the inside of the borehole from a borehole wall 115. Centralizers 117 and 119 maintain the hydrophone array tool 121 at the center of the tubing 113 as it moves along the borehole. Leakage occurs at a leakage location 133, causing cross contamination of fluids inside the tubing 113 and/or casing 111 with fluids in the borehole wall 115. The leakage location 133 emits an acoustic waveform 127 that can be detected by the hydrophone array tool 121. Although depicted as occurring in the casing 111, the leakage location 133 can alternatively occur in the tubing 113 and the acoustic waveform 127 can be emitted from the leakage occurring in the tubing 113. The leakage location 133 can thus vary with respect to leakage source depth and radial distance from the center of the borehole.

The hydrophone array tool 121 comprises acoustic sensors 100-104 which take acoustic measurements 106 of the acoustic waveform 127. The hydrophone array tool 121 can comprise additional sensors that can measure other operational parameters such as temperature, pressure, force, visual spectra, etc., downhole as well as a control unit that is configured to instruct the hydrophone array tool 121 to move up and down the borehole as it collects acoustic measurements 106. The acoustic sensors 100-104 can be hydrophones or any other device configured to measure acoustic waves underwater and configured to withstand the operational conditions downhole. An acoustic beamforming processor 125 (i.e., a computing device programmed to perform acoustic beamforming techniques) receives the acoustic measurements 106 from the acoustic sensors 100-104 and uses a beamforming technique to generate an initial estimate for the leakage location 133. The hydrophone array tool 121 repositions near the initial estimated leakage location to take more acoustic measurements 106.

The hydrophone array tool 121 contains in memory a set of anticipated acoustic velocities downhole that can be generated prior to deployment based on expected operational conditions, can be generated and/or updated downhole using sensor measurements, or can be forwarded to the hydrophone array 121 from a logging facility 131. Using beamforming techniques with the acoustic measurements 106 that are near the initial estimated leakage location and for velocities in the set of anticipated acoustic velocities, the acoustic beamforming processor 125 generates acoustic velocity-dependent beamforming maps 108. The acoustic beamforming processor 125 can generate the acoustic velocity-dependent beamforming maps 108 from the acoustic measurements 106 or a subset of the acoustic measurements 106 near the initial estimate for the leakage location 133 without taking additional acoustic measurements near the initial estimated leakage location. This enables the hydrophone array tool 121 to continue to measure and monitor leakage locations while it determines accurate estimates for previously measured leakages. The acoustic velocity-dependent beamforming maps 108 comprise maps of likelihood values for the leakage to occur at locations near the leakage location 133, wherein each beamforming map is generated using a distinct acoustic velocity from the set of anticipated acoustic velocities.

An acoustic velocity estimator 123 receives the acoustic velocity-dependent beamforming maps 108 and uses them to determine an estimated acoustic velocity 110 for fluid in the borehole near the leakage location 133. The acoustic velocity estimator 123 can compute second derivatives in the spatial directions (i.e. depth and radial direction in the borehole) of the beamforming maps and can determine a beamforming map having a maximal second derivative value. The estimated acoustic velocity 110 can be the acoustic velocity that was used to generate the beamforming map in the acoustic velocity-dependent beamforming maps 108 having a maximal second derivative. Other criteria for choosing the beamforming map corresponding to the estimated acoustic velocity 110, such as other spatial statistics including first spatial derivatives, maxima, local maxima, and combinations thereof can be used. The acoustic velocity estimator 123 sends the estimated acoustic velocity 110 to the acoustic beamforming processor 125.

The acoustic beamforming processor 125 retrieves the beamforming map from the acoustic velocity-dependent beamforming maps 108 corresponding to the estimated acoustic velocity 110 and sends it to a control unit 129. Additionally, the acoustic beamforming processor 125 determines an updated estimated leakage location 114 using the updated beamforming map 112 which it also sends to the control unit 129. The updated estimated leakage location 114 can be determined, for instance, as the maximal likelihood value in the updated beamforming map 112.

Subterranean operations can be conducted in FIG. 1 using a wireline system once the drillstring has been removed, though, at times, some or all of the drillstring can remain in the borehole during logging with the wireline system. The hydrophone array tool 121 can be suspended in the borehole by a conveyance 137 (e.g., a cable, slickline, or coiled tubing). The hydrophone array tool 121 can be communicatively coupled to the conveyance 137. The conveyance 137 can contain conductors for transporting power to the wireline system and telemetry from the hydrophone array tool 121 to the logging facility 131. Alternatively, the conveyance 137 can lack a conductor, as is often the case using slickline or coiled tubing, and the wireline system can contain the control unit 129 that contains memory, one or more batteries, and/or one or more processors for performing operations and storing measurements.

The control unit 129 can be positioned at the surface 109, in the borehole (e.g., in the conveyance 137 and/or as part of the hydrophone array tool 121) or both (e.g., a portion of the processing can occur downhole and a portion can occur at the surface 109). The control unit 129 can include a control system or a control algorithm. In certain embodiments, a control system, an algorithm, or a set of machine-readable instructions can cause the control unit 129 to generate and provide an input signal to one or more elements of the hydrophone array tool 121, such as the sensors along the hydrophone array tool 121. The input signal can cause the sensors to be active or to output signals indicative of sensed properties. The logging facility 131 (shown in FIG. 1 as a truck, although it can be any other structure) can collect measurements from the hydrophone array tool 121, and can include computing facilities for controlling, processing, or storing the measurements gathered by the hydrophone array tool 121. The computing facilities can be communicatively coupled to the hydrophone array tool 121 by way of the conveyance 137 and can operate similarly to the control unit 129.

Figure 2:
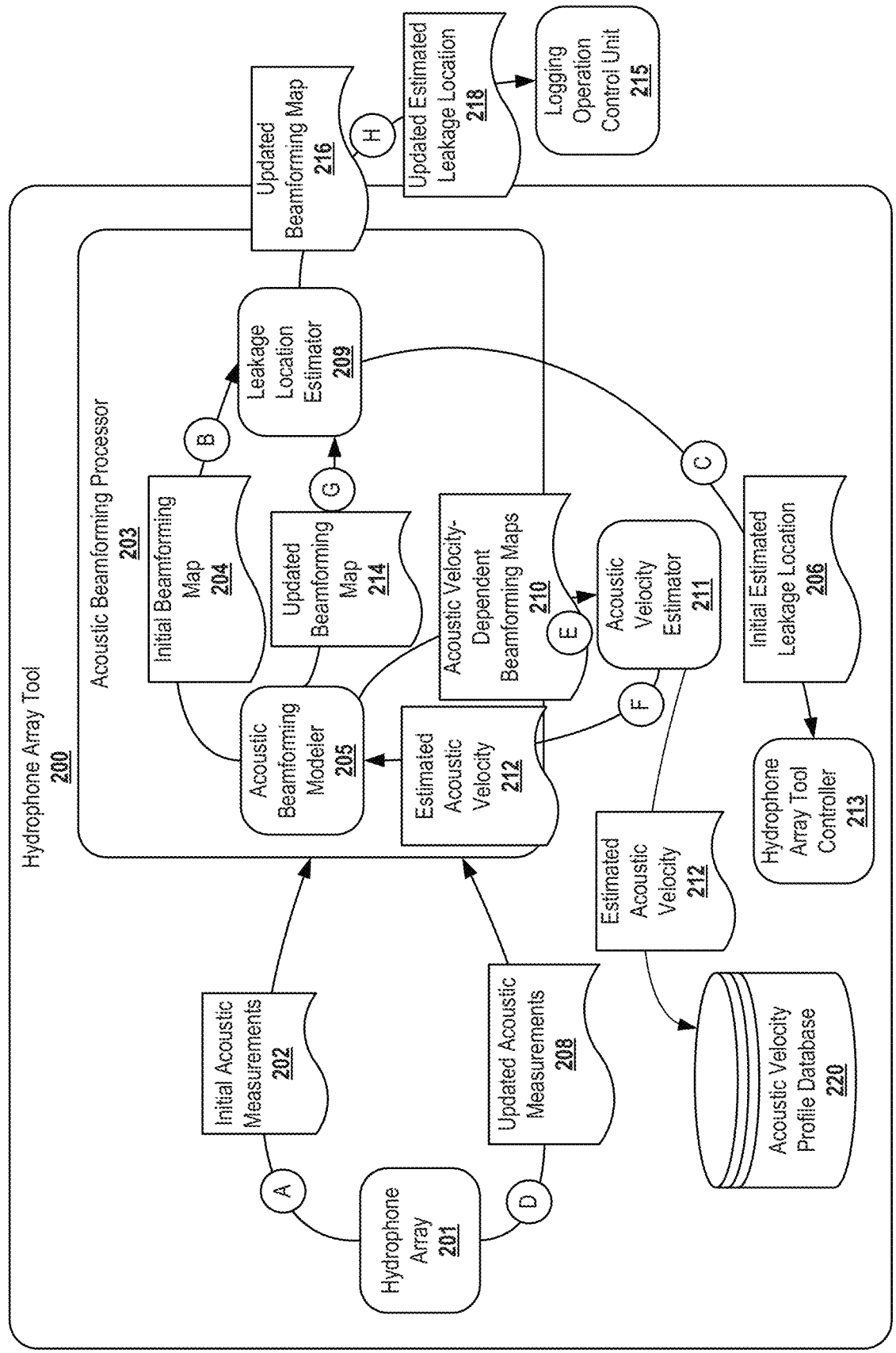
FIG. 2 is a conceptual diagram of a hydrophone array tool for determining estimates of leakage locations in a borehole using acoustic beamforming techniques with acoustic velocity estimation.

FIG. 2 is a conceptual diagram of a hydrophone array tool for determining estimates of leakage locations in a borehole using acoustic beamforming techniques with acoustic velocity estimation. A hydrophone array tool 200 comprises an acoustic beamforming processor 203, a hydrophone array 201, an acoustic velocity estimator 211, and a hydrophone array tool controller 213. The acoustic beamforming processor 203 comprises an acoustic beamforming modeler 205 and a leakage location estimator 209. The acoustic beamforming modeler 205 is configured to perform acoustic beamforming techniques on acoustic measurements such as delay-and-sum beamforming techniques, conventional beamforming techniques, adaptive beamforming techniques, etc. The output of these acoustic beamforming techniques is a beamforming map comprising likelihood values at locations throughout the wellbore. These techniques assume an acoustic velocity v of the fluid downhole that can be tuned based on models for acoustic velocity using operational conditions (temperature, pressure, etc.) as input. This acoustic velocity can be estimated by the acoustic velocity estimator 211. The leakage location estimator 209 determines an estimated leakage location based on beamforming maps output by the acoustic beamforming modeler 205.

FIG. 2 is annotated with a series of letters A-H. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, a hydrophone array 201 on the hydrophone array tool 200 detects initial acoustic measurements 202 in a region of investigation during a wireline operation and sends the initial acoustic measurements 202 to the acoustic beamforming processor 203. The hydrophone array 201 can be a linear array of hydrophones or other acoustic sensors. The initial acoustic measurements 202 can be taken at locations throughout a wireline operation and the hydrophone array tool 200 can move up or down a conveyance inside a tubing of the wireline operation while taking acoustic measurements. The hydrophone array tool 200 can be configured to take acoustic measurements while in motion at a predetermined rate according to the speed of the hydrophone array tool 200. The hydrophone array tool controller 213 can send instructions to the hydrophone array 201 to stop or slow acoustic measurements based on movements of the hydrophone array tool 200, available local memory, etc. The initial acoustic measurements 202 comprise pressure readings from each sensor in the hydrophone array 201 in addition to corresponding depth measurements (e.g., in feet) for each pressure from each sensor. When the hydrophone array tool 200 is stationary, each depth measurement can correspond to one or more pressure readings at the stationary location. When the hydrophone array tool 200 is moving, each depth measurement can be an average depth for one or more pressure readings by the hydrophone array tool 200 at varying locations.

At stage B, the acoustic beamforming modeler 205 receives the initial acoustic measurements 202 and performs acoustic beamforming techniques to generate an initial beamforming map 204. The initial beamforming map 204 can comprise likelihood values within the range of depths where the initial acoustic measurements 202 were taken. Alternatively, likelihood values can be within a projected range of possible depths for a leakage location based on the acoustic beamforming modeler 205 performing acoustic beamforming techniques. The acoustic beamforming modeler 205 can perform continuous updates to the initial beamforming map 204 at additional locations in the borehole as the hydrophone array tool 200 moves downhole and the hydrophone array 201 takes additional acoustic measurements. The acoustic beamforming modeler 205 can send these updates (i.e. additional likelihood values) of the initial beamforming map 204 to the leakage location estimator 209 as it computes them.

At stage C, the leakage location estimator 209 receives the initial beamforming map 204 from the acoustic beamforming modeler 205 and determines an initial estimated leakage location 206. The leakage location estimator 209 can determine the initial estimated leakage location 206 as the location corresponding to the maximal likelihood value in the initial beamforming map 204. Alternatively, the leakage location estimator 209 can determine that a location has a likelihood value that is both a local maximum likelihood value and is above a threshold likelihood value. Additional or alternative criteria for determining leakage locations can be used. The hydrophone array tool controller 213, in response to receiving the initial estimated leakage location 206, can position the hydrophone array tool 200 near the initial estimated leakage location 206. Alternatively, the initial acoustic measurements 202 or a subset thereof can be used for any additional beamforming maps by the acoustic beamforming processor 203. The hydrophone array tool controller 213 can, as it receives additional leakage locations from the leakage location estimator 209, position the hydrophone array tool 200 at each additional leakage location to take additional acoustic measurements. This repositioning can occur as each additional leakage location is estimated by the leakage location estimator 209, can occur after batches of leakages are estimated (e.g., after every 5 leakages), can occur after acoustic measurement cycles by the hydrophone array tool, etc. When the leakage location estimator 209 receives updates to the initial beamforming map 204 as the hydrophone array tool 200 repositions to new regions, the leakage location estimator 209 can determine additional estimated leakage locations in the initial beamforming map 204 which it can forward, along with the initial estimated leakage location 206, to the hydrophone array tool controller 213.

At stage D, the hydrophone array 201 takes updated acoustic measurements 208 at the initial estimated leakage location 206. The updated acoustic measurements 208 can be acoustic measurements for the hydrophone array tool situated at or around the initial estimated leakage location 206 and comprise acoustic signal waveforms at each hydrophone as well as the corresponding depth and radial distance. In some embodiments, the hydrophone array 201 can take multiple acoustic measurements at the same location to increase robustness of the updated acoustic measurements 208 and reduced noise. Alternatively, the updated acoustic measurements 208 can be the initial acoustic measurements 202 localized to the initial estimated leakage location 206 to save the computational and operational cost of repositioning the hydrophone array tool 200 and taking/storing additional acoustic measurements.

At stage E, the acoustic beamforming modeler 205 receives the updated acoustic measurements 208 and uses acoustic beamforming techniques on the updated acoustic measurements 208 to generate the acoustic velocity-dependent beamforming maps 210. The acoustic beamforming modeler 205 performs an acoustic beamforming technique for each of a set of anticipated acoustic velocity values with the updated acoustic measurements 208. The acoustic beamforming modeler 205 can average beamforming maps for each velocity using the additional acoustic measurements in the updated acoustic measurements 208 taken at stage D. Some of the additional acoustic measurements may not capture a signal for the leakage, and the acoustic beamforming modeler 205 can omit the acoustic beamforming maps for these acoustic measurements when averaging. The set of anticipated acoustic velocity values can be predetermined by a logging operator as hard coded values that depend on the depth of the borehole as well as operational conditions such as temperature, pressure, fluid type, etc. Or the set of anticipated acoustic velocity values can be determined by the hydrophone array tool 200 at the initial estimated leakage location 206 downhole based on sensor measurements. The anticipated set of acoustic velocity values can be maintained/updated both as the acoustic velocity estimator 211 generates estimates of acoustic velocity downhole and as the hydrophone array tool 200 takes sensor measurements downhole.

At stage F, the acoustic velocity estimator 211 generates an estimated acoustic velocity 212 based on the acoustic velocity-dependent beamforming maps 210 which it sends to the acoustic beamforming modeler 205. The estimated acoustic velocity 212 can be the acoustic velocity corresponding to the beamforming map in the acoustic velocity-dependent beamforming maps 210 having a maximal spatial second derivative, wherein the spatial second derivative is computed for each beamforming map according to the following equation:

$$L = \frac{1}{4}\left(\frac{\partial^2 U}{\partial x^2} + \frac{\partial^2 U}{\partial y^2}\right)$$

where L is the spatial second derivative, U is the amplitude (i.e., likelihood values) of the beamforming map, and x and y represent radial distance and depth, respectively. For efficiency, the spatial second derivatives can be performed with multiple grid searches. First, a coarse grid search of the spatial second derivatives can be performed to determine a maximal spatial second derivative. Subsequently, a finer grid search near the location of the maximal spatial second derivative can be performed. The grid search can include finer granularities. The multi-tiered grid search can be performed for any of the other spatial statistics mentioned herein. Alternatively, the estimated acoustic velocity 212 can be chosen as the acoustic velocity for the beamforming map in the acoustic velocity-dependent beamforming maps 210 having a highest likelihood value. Other criteria, such as average magnitude of the first derivatives for each beamforming map in a neighborhood of the estimated leakage location as computed by $$D = \frac{\partial U}{\partial x} + \frac{\partial U}{\partial y},$$

can be used. Multiple criteria can be combined—for instance, when two beamforming maps in the acoustic velocity-dependent beamforming maps 210 have equal maximal second derivatives then the map with the highest likelihood value can be chosen.

The hydrophone array tool 200 can maintain an acoustic velocity profile database 220 for the formation as it receives estimated acoustic velocities (e.g., the estimated acoustic velocity 212) from the acoustic velocity estimator 211. The acoustic velocity profile database 220 can comprise a log of estimated acoustic velocities at corresponding depths/radial distances throughout the borehole. For future leakage detection, estimated acoustic velocities in the acoustic velocity profile database 220 with depths and radial distances near an initial leakage location as indicated in the initial beamforming map 204 can be used when determining the updated beamforming map 214. When the depth and radial distance of the stored, estimated acoustic velocities are sufficiently close to the initial leakage location, the operations at stages E and F can be skipped. Alternatively, the acoustic velocities in the acoustic velocity-dependent beamforming maps 210 can be chosen to be close to the acoustic velocity(ies) retrieved from the acoustic velocity profile database 220.

At stage G, the acoustic beamforming modeler 205 sends an updated beamforming map 214 to the leakage location estimator 209. The updated beamforming map 214 corresponds to the beamforming map in the acoustic velocity-dependent beamforming maps 210 that was generated using the estimated acoustic velocity 212. Alternatively, the acoustic velocity estimator 211 can send the updated beamforming map 214 directly to the leakage location estimator 209 once it determines the estimated acoustic velocity 212.

At stage H, the leakage location estimator 209 determines an updated estimated leakage location 218 in the updated beamforming map 216 to a logging operation control unit 215. For instance, the updated estimated leakage location 218 can be the location of the highest likelihood value in the updated beamforming map 216. Other criteria can be used to determine the updated estimated leakage location 218, and locations with equal likelihood values can be resolved by randomly choosing one of the locations having a maximal likelihood value, evaluating other statistics such as first or second spatial derivatives of the updated beamforming map 216, etc. The logging operation control unit 215 can initiate operations for repairing the tubing and/or casing in the borehole at the updated estimated leakage location.

Figure 3:
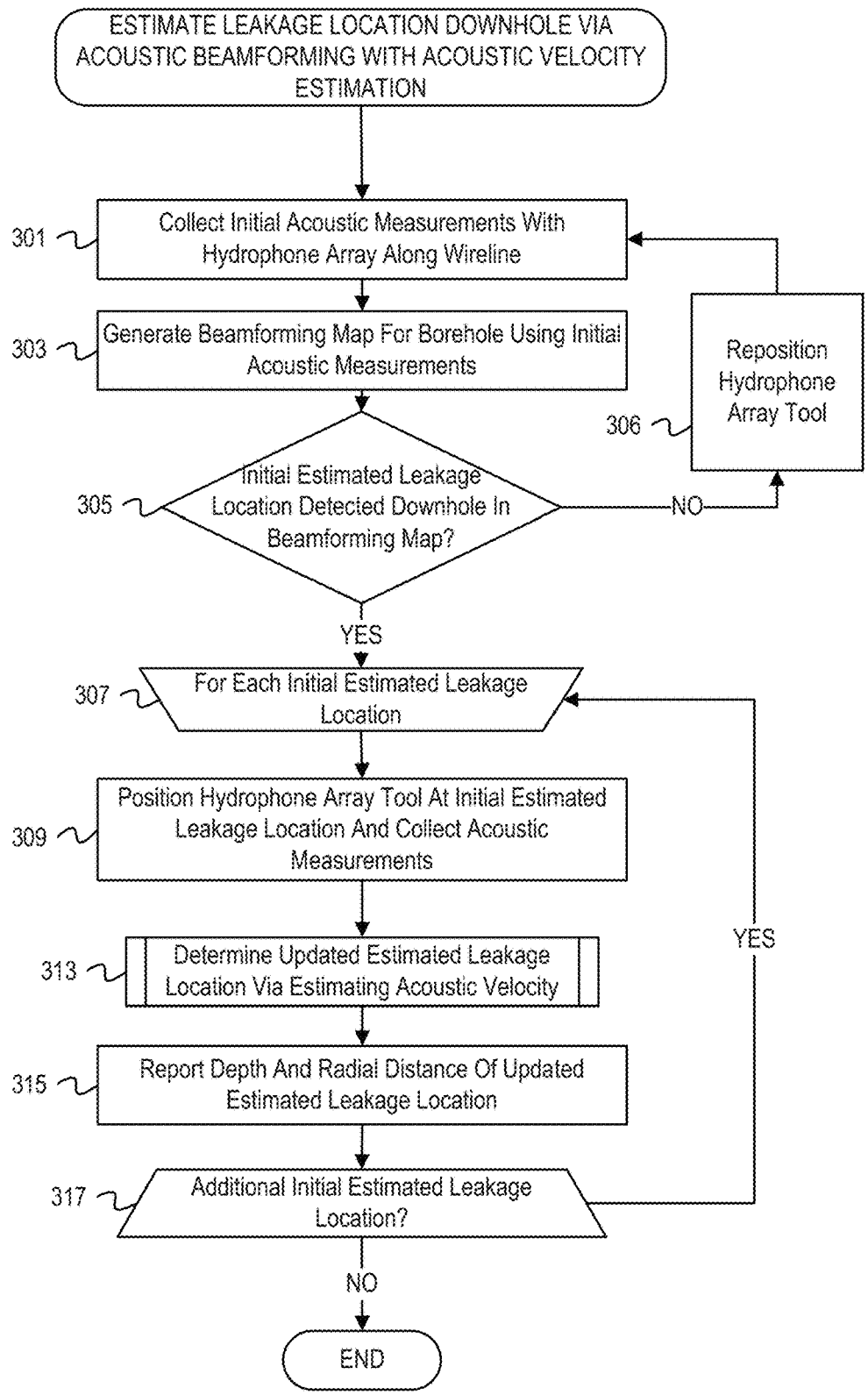
FIG. 3 is a flowchart of example operations for estimating a leakage location downhole via acoustic beamforming with acoustic velocity estimation.
Figure 4:
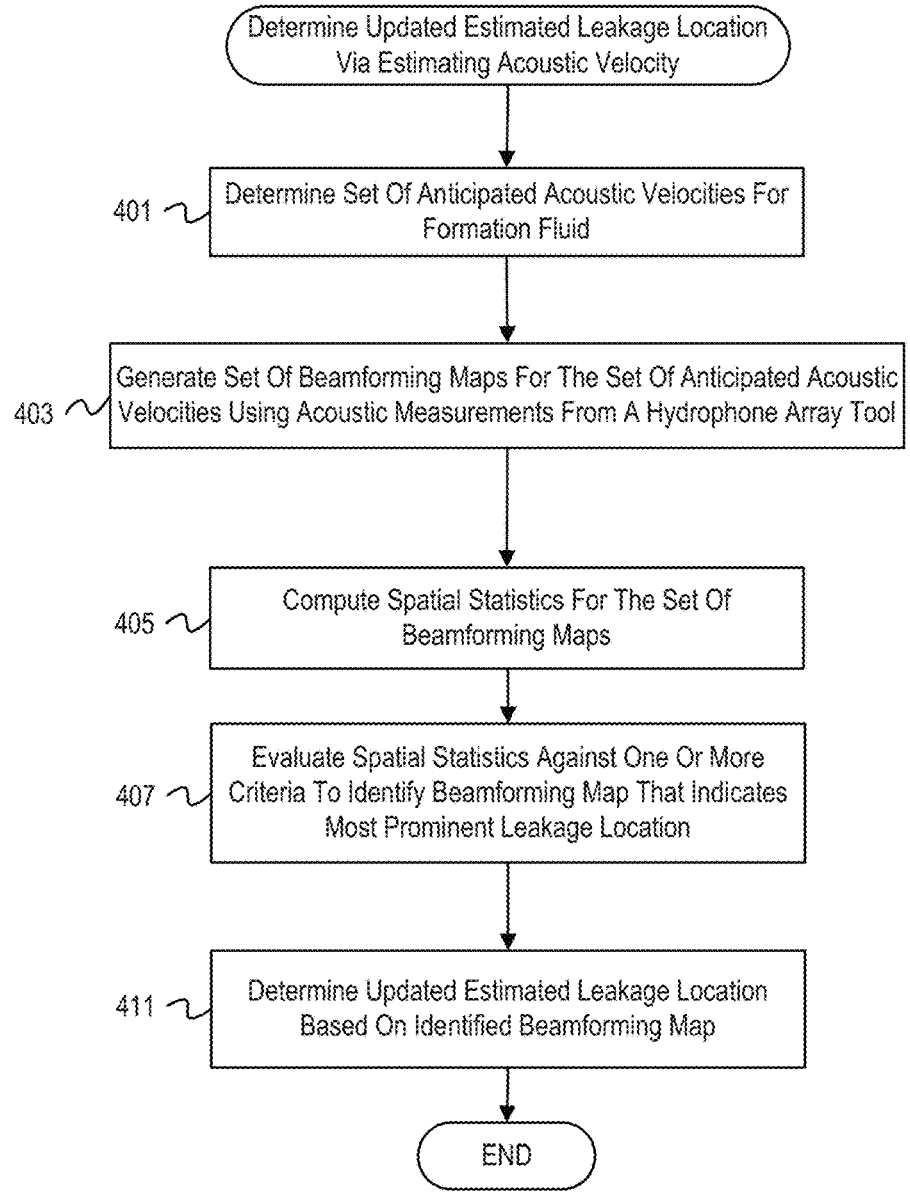
FIG. 4 is a flowchart of example operations for determining an estimated leakage location via estimating acoustic velocity.

The example operations in FIGS. 3-4 are described with reference to a hydrophone array tool controller, an acoustic velocity estimator, and an acoustic beamforming processor for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for estimating a leakage location downhole via acoustic beamforming with acoustic velocity estimation. At block 301, a hydrophone array tool controller collects initial acoustic measurements with a hydrophone array along regions of investigation scanned during a wireline operation in a borehole. The hydrophone array comprises a linear array of hydrophones or other acoustic sensors that can operate downhole. The hydrophone array tool controller can control a tool to collect acoustic measurements in the regions of investigation. The acoustic measurements can be taken at a rate corresponding to the speed of the hydrophone array tool moving up and down a wireline.

At block 303, an acoustic beamforming processor generates a beamforming map for the borehole using the acoustic measurements collected at block 301. The beamforming map comprises likelihood values of a leakage occurring at locations downhole. Each location comprises a depth and radial distance from the center of the borehole. The acoustic beamforming processor can generate the beamforming map after the hydrophone array tool controller finishes a cycle of taking acoustic measurements. The hydrophone array controller can continuously update the beamforming map for the borehole as acoustic measurements are collected (e.g., after a threshold number of acoustic measurements are collected).

At block 305, the acoustic beamforming processor determines whether there is a leakage detected downhole based on the beamforming map generated at block 303. The acoustic beamforming processor can determine that a likelihood value is above a threshold likelihood value for determining the presence of a leakage. Other criteria, such as a cluster or neighborhood of likelihood values at adjacent locations downhole being above a threshold likelihood value, can be used. The acoustic beamforming processor can apply the criteria for detecting a leakage downhole as the beamforming map is generated at block 303. In embodiments where the beamforming map is continuously updated as acoustic measurements are received, the acoustic beamforming processor can continuously apply the criteria to ensure that leakages are detected as soon as the corresponding beamforming map is generated. If the acoustic beamforming processor detects a leakage or multiple leakages above a threshold number of leakages, operations continue to block 307. Otherwise, operations proceed to block 306.

At block 306, the hydrophone array tool controller repositions the hydrophone array tool. The hydrophone array tool controller can reposition the hydrophone array tool to a location that has not been mapped or recently been mapped by the acoustic beamforming processor. The hydrophone array tool controller can reposition the hydrophone array tool along a direction (e.g., up or down) and, once the hydrophone array tool reaches the top or bottom of borehole or, in some embodiments, the top or bottom of a region of investigation, can reposition the hydrophone array tool at the opposite end. Once a full pass of the region of investigation or wireline is complete, the hydrophone array tool controller can pause for an interval before recommencing beamforming mapping.

At block 307, the hydrophone array tool controller begins iterating through detected leakages. The operations at each iteration are described at blocks 309, 311, 313, and 315. The hydrophone array tool controller can determine an order to visit the detected leakages based on the current position of the hydrophone array tool and the locations of the detected leakages to minimize travel time for the hydrophone array tool.

At block 309, the hydrophone array tool controller positions the hydrophone array tool at the location of the detected leakage for the current iteration and collects acoustic measurements. The hydrophone array tool controller can collect more acoustic measurements than were collected at block 301 when the leakage was initially detected. Multiple acoustic measurements taken can be taken to increase robustness. The hydrophone array tool controller can take acoustic measurements both at the location of the detected leakage and at nearby locations (e.g., within a threshold distance of the detected leakage). Taking acoustic measurements at adjacent locations to the detected leakage can compensate for inaccuracy in the initial location of the detected leakage. In other embodiments, the hydrophone array tool controller need not take additional acoustic measurements and subsequent beamforming maps can be computed using the initial acoustic measurements collected at block 301 or a subset thereof.

At block 313, the acoustic beamforming processor determines an estimated leakage location via estimating acoustic velocity at the location of the detected leakage. The operations at block 313 are described in greater detail in FIG. 4. If an estimated acoustic velocity has previously been determined within a threshold distance (e.g., 50 feet) of the initial estimated leakage location, then the acoustic beamforming processor can skip the operations at block 313 and instead compute an updated beamforming map using the previously estimated acoustic velocity and can determine the estimated leakage location using the updated beamforming map.

At block 315, the hydrophone array tool controller reports the depth and radial distance of the estimated leakage location determined at block 309. The hydrophone array tool controller can report to a controller of the wireline operation and/or a user with operational control of the wireline operation. The controller of the wireline operation can, in response to receiving an estimated radial distance and depth of a leakage location, begin operations for repairing the tubing and/or casing at the estimated depth. The controller can determine whether to replace the tubing or the casing based on the radial distance of the estimated leakage.

At block 317, the hydrophone array tool controller determines whether there is an additional leakage location. Additional leakage locations can be detected by reiterating the operations depicted at blocks 301, 303, 305, and 306 until a leakage is detected or there can be multiple initial leakage locations previously detected at these blocks that can be iteratively updated in the operations depicted at blocks 307, 309, 311, 313, 315, and 317. If an additional leakage location exists, operations return to block 307. Otherwise, the operations in FIG. 3 are complete.

FIG. 4 is a flowchart of example operations for determining an estimated leakage location via estimating acoustic velocity. At block 401, an acoustic beamforming processor determines a set of anticipated acoustic velocities for a formation fluid. The set of anticipated velocities can be a hardcoded set of acoustic velocities based on known operational conditions downhole that account for a reasonable range of possible acoustic velocities. In addition or alternatively, the set of anticipated acoustic velocities can be updated based on sensor measurements taken downhole at an initial leakage location. In some embodiments, the set of anticipated acoustic velocities is a uniform range of acoustic velocities between maximal and minimal acoustic velocities that are reasonable to occur downhole (e.g. 1300 meters per second (m/s), 1400 m/s, 1500 m/s, 1600 m/s, 1700 m/s). The number of acoustic velocities can depend on the available computing resources for a hydrophone array tool.

At block 403, the acoustic beamforming processor generates a set of beamforming maps for the set of anticipated acoustic velocities using acoustic measurements from the hydrophone array tool. The acoustic measurements can be taken near an initial estimated leakage location (e.g. within 50 meters) to be updated. The acoustic beamforming processor applies an acoustic beamforming technique assuming a distinct acoustic velocity in the set of anticipated acoustic velocities to generate each map in the set of beamforming maps. The acoustic beamforming processor can use the same acoustic beamforming technique (e.g. delay sum beamforming) across the set of beamforming maps, with the only variation being the assumed acoustic velocity.

At block 405, the acoustic velocity estimator computes spatial statistics for the set of beamforming maps generated at block 403. The spatial statistics can comprise one or more of spatial second derivatives, spatial first derivatives, maximal likelihood values, local maxima likelihood values, etc. Computation of the spatial statistics can be optimized using a multi-level grid search, wherein first a maximal spatial statistic is found at a coarse grid, then a finer grid near the maximal spatial statistic is searched.

At block 407, the acoustic velocity estimator evaluates the spatial statistics computed at block 405 against one or more criteria to identify which of the beamforming maps has the most prominent leakage location as represented by the spatial statistics. For instance, when the spatial statistic is a spatial second derivative, a criterion can be whether the beamforming map has a spatial second derivative value that is higher than all spatial second derivative values for the other beamforming maps. For multiple beamforming maps having the same maximal spatial second derivative, an additional criterion can be that the maximal likelihood value for a beamforming map is greater than all likelihood values for the other beamforming maps. Different combinations of spatial statistics and criteria can be used.

At block 411, the acoustic beamforming processor determines an updated estimated leakage location based on the identified beamforming map. The updated estimated leakage location can be determined as the location of the maximal likelihood value of the identified beamforming map.

Figure 5:
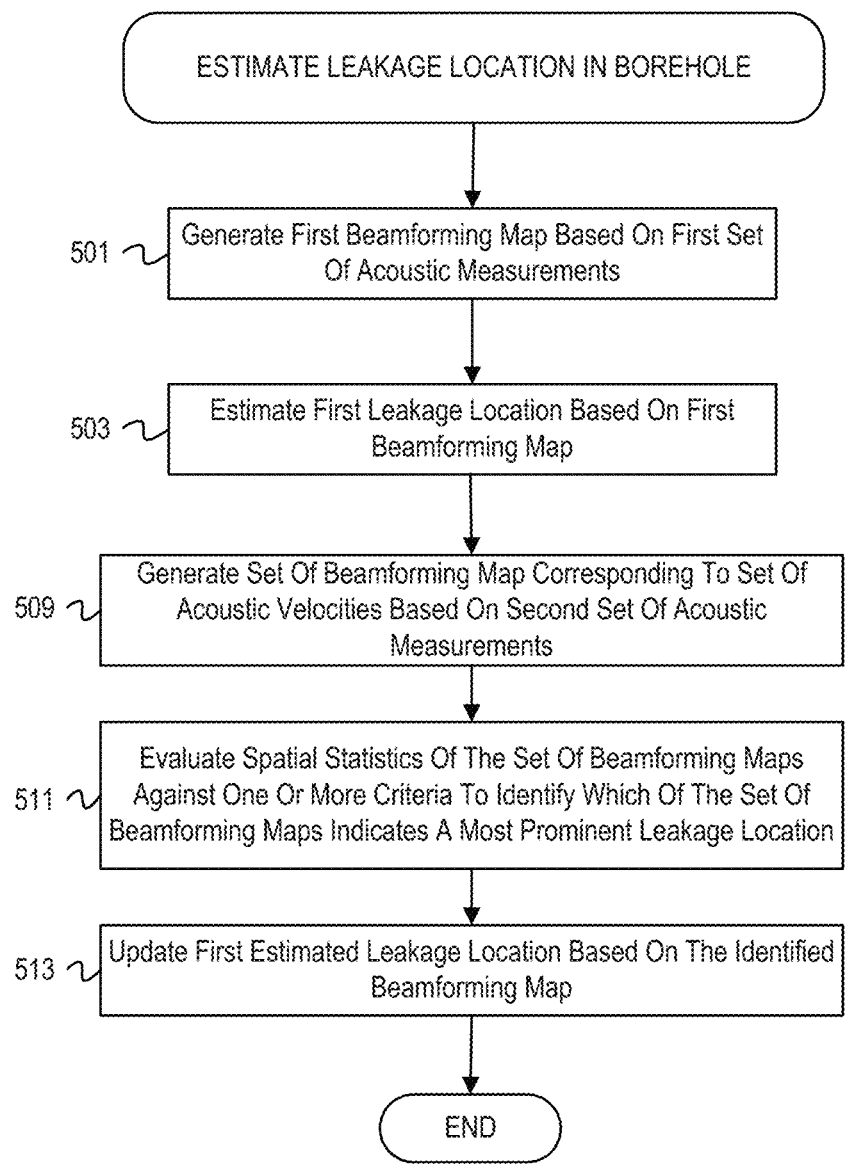
FIG. 5 is a flowchart of example operations for estimating a leakage location in a borehole.

FIG. 5 is a flowchart of example operations for estimating a leakage location in a borehole. At block 501, a hydrophone array tool controller generates a first beamforming map based on a first set of acoustic measurements. The first set of acoustic measurements can be measured by the hydrophone array tool along a region of interest during a wireline operation. The first beamforming map comprises likelihood values that indicate the likelihood of a leakage occurring at locations within the region of interest. Any acoustic beamforming technique including conventional acoustic beamforming and adaptive acoustic beamforming can be used to generate the first beamforming map.

At block 503, the hydrophone array tool controller estimates a first leakage location based on the first beamforming map. The hydrophone array tool controller can estimate the first leakage location as the location corresponding to the maximal likelihood value in the beamforming map. Alternatively, the first estimated leakage location can be an average of leakage locations having high likelihood values (e.g., above a threshold likelihood value) or according to another metric.

At block 509, the hydrophone array tool controller generates a set of beamforming maps corresponding to a set of acoustic velocities based on a second set of acoustic measurements. The hydrophone array tool controller applies acoustic beamforming techniques to the second set of measurements assuming each velocity in the set of acoustic velocities. The set of acoustic velocities is a set of anticipated acoustic velocities determined based on expected conditions downhole. These anticipated acoustic velocities can be predetermined or updated as the hydrophone array tool controller receives measurements (e.g., temperature, pressure, force measurements) downhole. The second set of acoustic measurements can be identical to the first set of acoustic measurements, a subset of the first set of acoustic measurements, or can be taken as additional measurements by a hydrophone array on the hydrophone array tool controller. The hydrophone array tool controller can position the hydrophone tool at the first estimated leakage location prior to taking additional measurements.

At block 511, the hydrophone array tool controller evaluates spatial statistics of the set of beamforming maps against one or more criteria to identify which of the set of beamforming maps indicates a most prominent leakage location. The spatial statistics can be spatial second derivatives of the likelihood values in the beamforming maps or can be other spatial statistics of the likelihood values such as first derivatives, local or global maxima, etc. The one or more criteria can be whether a spatial second derivative value in a beamforming map of the set of beamforming maps is greater than all other spatial second derivative values for the set of beamforming maps. Other criteria using different spatial statistics can be used in addition or alternatively.

At block 513, the hydrophone array tool controller updates the first estimated leakage location based on the identified beamforming map. The hydrophone array tool controller can determine a location corresponding to a maximal likelihood value in the identified beamforming map. This location can be average or biased with the first estimated leakage location and/or estimated leakage locations in the set of beamforming maps.

The flowcharts are provided to aid in understanding the illustrations and are not to be used to limit scope of the claims. The flowcharts depict example operations that can vary within the scope of the claims. Additional operations can be performed; fewer operations can be performed; the operations can be performed in parallel; and the operations can be performed in a different order. For example, the operations depicted in blocks 301 and 303 can be performed in parallel or concurrently. It will be understood that each block of the flowchart illustrations and/or block diagrams, and combinations of blocks in the flowchart illustrations and/or block diagrams, can be implemented by program code. The program code can be provided to a processor of a general-purpose computer, special purpose computer, or other programmable machine or apparatus.

As will be appreciated, aspects of the disclosure can be embodied as a system, method or program code/instructions stored in one or more machine-readable media. Accordingly, aspects can take the form of hardware, software (including firmware, resident software, micro-code, etc.), or a combination of software and hardware aspects that can all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) can be utilized. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain or store a program for use by or in connection with an instruction execution system, apparatus, or device. A machine-readable storage medium is not a machine-readable signal medium.

A machine-readable signal medium can include a propagated data signal with machine-readable program code embodied therein, for example, in baseband or as part of a carrier wave. Such a propagated signal can take any of a variety of forms, including, but not limited to, electromagnetic, optical, or any suitable combination thereof. A machine-readable signal medium can be any machine-readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing. The program code/instructions can also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 6:
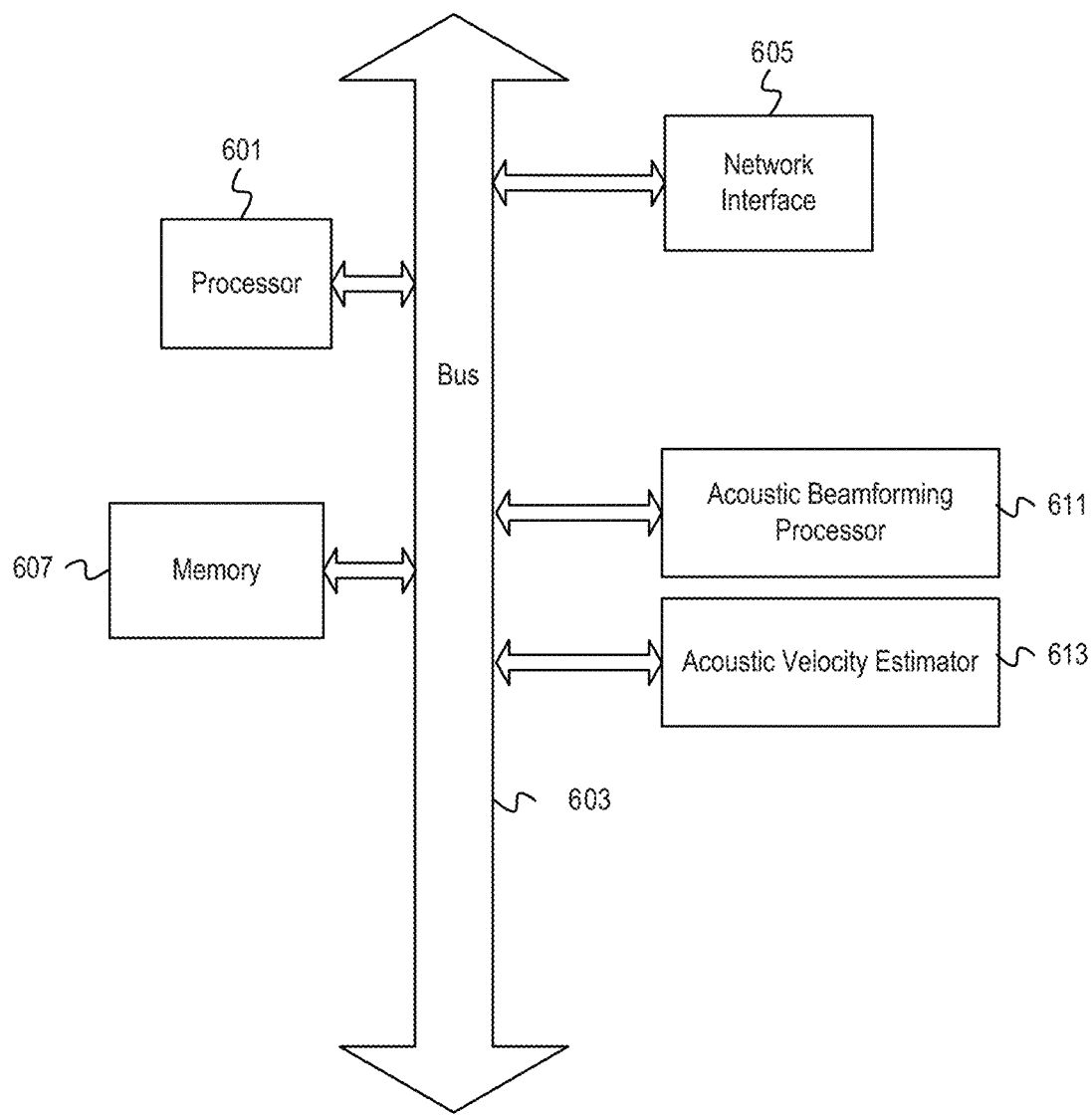
FIG. 6 depicts an example computer system with an acoustic beamforming processor and an acoustic velocity estimator.

FIG. 6 depicts an example computer system with an acoustic beamforming processor and an acoustic velocity estimator. The computer system includes a processor 601 (possibly including multiple processors, multiple cores, multiple nodes, and/or implementing multi-threading, etc.). The computer system includes memory 607. The memory 607 can be system memory or any one or more of the above already described possible realizations of machine-readable media. The computer system also includes a bus 603 and a network interface 605. The system communicates via transmissions to and/or from remote devices via the network interface 605 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.). The system also includes an acoustic velocity estimator 613 and an acoustic beamforming processor 611. The acoustic beamforming processor 611 can generate beamforming maps corresponding to a set of anticipated acoustic velocities. The acoustic velocity estimator 613 can determine spatial statistics of these beamforming maps and use the spatial statistics to determine an acoustic velocity corresponding to a beamforming map having a most prominent leakage location. The acoustic beamforming processor 611 can estimate the leakage location downhole using the beamforming map corresponding to the determined acoustic velocity, as described variously above. Any one of the previously described functionalities can be partially (or entirely) implemented in hardware and/or on the processor 601. For example, the functionality can be implemented with an application specific integrated circuit, in logic implemented in the processor 601, in a co-processor on a peripheral device or card, etc. Further, realizations can include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 can be coupled to the processor 601.

While the aspects of the disclosure are described with reference to various implementations and exploitations, it will be understood that these aspects are illustrative and that the scope of the claims is not limited to them. In general, techniques for acoustic beamforming techniques using estimated acoustic velocities as described herein can be implemented with facilities consistent with any hardware system or hardware systems. Many variations, modifications, additions, and improvements are possible.

Plural instances can be provided for components, operations or structures described herein as a single instance. Finally, boundaries between various components, operations and data stores are somewhat arbitrary, and particular operations are illustrated in the context of specific illustrative configurations. Other allocations of functionality are envisioned and can fall within the scope of the disclosure. In general, structures and functionality presented as separate components in the example configurations can be implemented as a combined structure or component. Similarly, structures and functionality presented as a single component can be implemented as separate components. These and other variations, modifications, additions, and improvements can fall within the scope of the disclosure.

Figure 7:
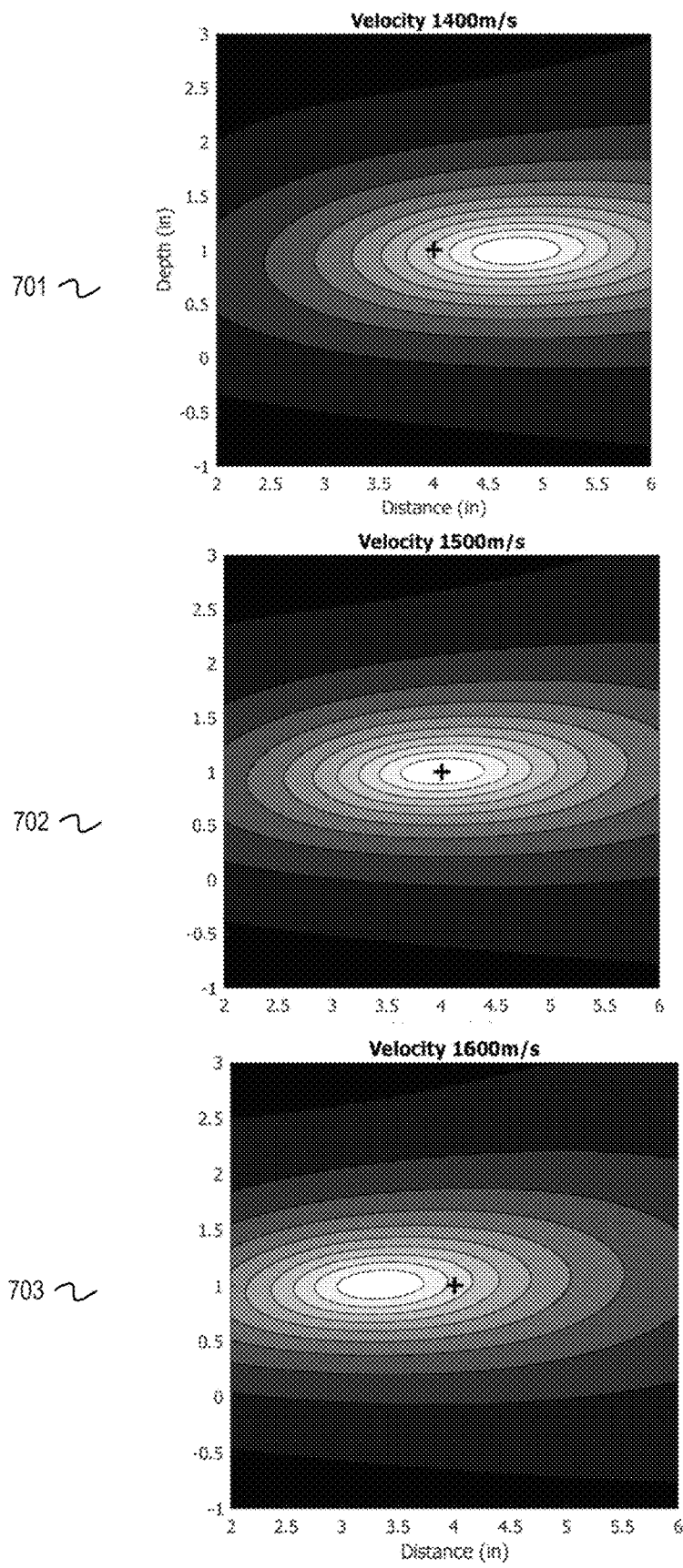
FIG. 7 depicts example plots of beamforming maps for estimating a leakage location with varying acoustic velocities.

FIG. 7 depicts example plots of beamforming maps for estimating a leakage location with varying acoustic velocities. For each plot 701, 702, and 703, the x-axis is radial distance from the center of the boreholes in inches and the y-axis is depth in the borehole in inches. Depth ranges from −1 to 3 inches and radial distance ranges from 2 to 6 inches. Zero inches in depth, as depicted in plots 701-703, can vary and does not necessarily correspond to surface depth. In the plots 701-703, the crosshair at the center of each plot corresponds to the true leakage location at a radial distance of 4 inches and a depth of 1 inch. The shading represents likelihood values for the beamforming maps in each of the respective plots 701-703, with lighter shades corresponding to higher likelihood values. Contours of likelihood values appear as concentric ovals, with the maximal likelihood values being approximately centered around radial distance of 4.8 inches and depth of 1 inch in plot 701, radial distance of 4 inches and depth of 1 inch in plot 702, and radial distance of 3.4 inches and depth of 1 inch in plot 703.

Plots 701, 702, and 703 correspond to beamforming maps wherein the acoustic beamforming technique assumed acoustic velocities of 1400 meters per second (m/s), 1500 m/s, and 1600 m/s, respectively. The acoustic velocity of 1500 m/s resulted in a beamforming map with an accurate estimated leakage location corresponding to the maximal likelihood values around radial distance 4 inches, depth 1 inch. These plots 701-703 demonstrate that location estimation can be biased by up to 0.75 inches (~19%) with a 100 m/s acoustic velocity error (~7%). An acoustic beamforming processor using the techniques described in the foregoing can choose an acoustic velocity of 1500 m/s based on determining that the beamforming map in plot 702 has a spatial second derivative or other spatial statistical parameter that satisfies a criterion (e.g., that the spatial second derivative is maximal across the beamforming maps in plots 701-703).

Figure 8:
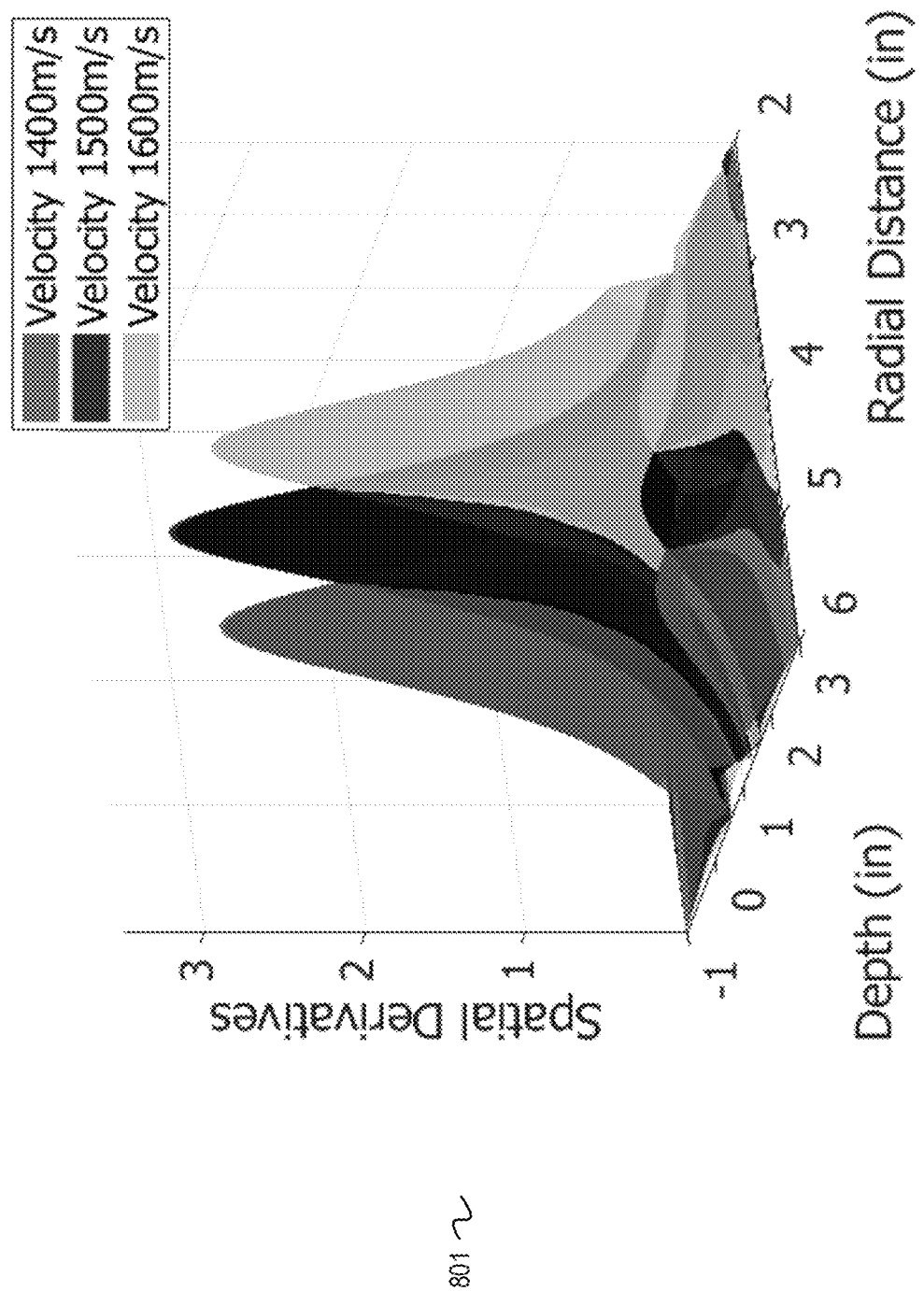
FIG. 8 depicts a plot of spatial second derivatives of beamforming maps corresponding to varying acoustic velocities plotted with respect to radial distance and depth

FIG. 8 depicts a plot of spatial second derivatives of beamforming maps corresponding to varying acoustic velocities plotted with respect to radial distance and depth. Each shaded surface in a plot 801 corresponds to a different acoustic velocity, the surfacer with light shading corresponding to 1600 m/s, the surface with medium shading corresponding to 1400 m/s, and the surface with dark shading corresponding to 1500 m/s. The vertical axis is the magnitude of spatial second derivatives for each surface, and the horizontal axes are depth in inches and radial distance in inches. The surfaces in plot 801 can correspond to spatial second derivatives for the beamforming maps depicted in FIG. 7. The spatial second derivatives are computed according to the equation $$L = \frac{1}{4}\left(\frac{\partial^2 U}{\partial x^2} + \frac{\partial^2 U}{\partial y^2}\right),$$

wherein U is the beamforming map, x is the depth direction in the beamforming map, and y is the radial distance direction in the beamforming map. Different normalizations can be used, and different metrics such as first derivatives, local maxima, etc. can be evaluated and plotted instead. As described in the foregoing, an acoustic beamforming processor can choose the surface with medium shading for leakage location estimation because it has a maximal spatial second derivative (approximately 3).

Variations

Any of the aforementioned hydrophone array tools can have two operational modes—a "continuous" mode and a "stationary" mode. In the continuous mode, the hydrophone array tool scans a borehole and generates beamforming maps as it collects acoustic measurements. The beamforming maps can be continuously updated and can roughly estimate leakage locations. Once a leakage location is detected, periodically after a time interval elapses or after a threshold number of leakage locations are detected, the hydrophone array tool can enter a stationary mode. In the stationary mode, the hydrophone array tool sequentially visits the estimated locations of each of the detected leakages. At each location, the hydrophone array tool takes additional acoustic measurements of the acoustic source which it uses to generate additional beamforming maps with varying acoustic velocities. An acoustic beamforming processor and acoustic velocity estimator use the additional beamforming maps to update the initial estimate of the leakage location, as described variously above. The hydrophone array tool can continuously alternate between the continuous mode and stationary mode. The continuous mode can trigger once the stationary mode updates an estimated leakage location, once there are no more detected leakage locations that need to be more accurately estimated, etc.

The acoustic beamforming techniques described in the foregoing assume a single acoustic velocity downhole. When different fluids are present inside of the tubing and inside of the casing, there can be multiple acoustic velocities along the trajectory from the acoustic source to the hydrophone array tool. Acoustic beamforming techniques that compensate for multiple fluid layers can be implemented. To exemplify finding two acoustic velocities simultaneously, a possible method is to initialize velocities $v_1$ and $v_2$. Then, the optimal $v_2$ can be determined by generating beamforming maps for multiple values of $v_2$ and determining the beamforming map corresponding to the best estimate for acoustic velocity, as described variously above. Once $v_2$ is optimized, then the optimal $v_2$ can be fixed and $v_1$ can be optimized using the same process. This alternating optimization can be iterated until a threshold number of iterations is reached or until the difference between acoustic velocity estimates in subsequent iterations is sufficiently small.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

EXAMPLE EMBODIMENTS

Embodiment 1 a method comprising based, at least in part, on a first set of acoustic measurements of a borehole, generating a first beamforming map, estimating a first leakage location based, at least in part, on the first beamforming map, based, at least in part, on a second set of acoustic measurements, generating a set of beamforming maps corresponding to a set of acoustic velocities, evaluating spatial statistics of the set of beamforming maps against one or more criteria to identify which of the set of beamforming maps indicates a most prominent leakage location, and updating the first estimated leakage location based, at least in part, on the identified beamforming map.

Embodiment 2 the method of Embodiment 1, further comprising determining an estimated acoustic velocity at the first estimated leakage location as an acoustic velocity in the set of acoustic velocities used to generate the identified beamforming map.

Embodiment 3 the method of Embodiment 2, further comprising updating an acoustic velocity profile of the borehole with the estimated acoustic velocity at the first estimated leakage location.

Embodiment 4 the method of any of Embodiments 1-3, wherein updating the first estimated leakage location comprises identifying a location having a maximal likelihood value in the identified beamforming map, and indicating the location having the maximal likelihood value as an updated estimated leakage location.

Embodiment 5 the method of any of Embodiments 1-4, further comprising determining the set of acoustic velocities based, at least in part, on operational conditions in the borehole.

Embodiment 6 the method of any of Embodiments 1-5, wherein the spatial statistics of the set of beamforming maps comprise spatial second derivatives of likelihood values in the set of beamforming maps.

Embodiment 7 the method of Embodiment 6, wherein evaluating the spatial statistics against the one or more criteria comprises determining which of the set of beamforming maps has a maximal spatial second derivative.

Embodiment 8 the method of any of Embodiments 1-7, further comprising positioning a hydrophone array tool in the borehole at the first estimated leakage location.

Embodiment 9 the method of Embodiment 8, further comprising obtaining the second set of acoustic measurements with the hydrophone array tool at the first estimated leakage location.

Embodiment 10 the method of any of Embodiments 1-9, wherein estimating the first leakage location comprises identifying a location having a maximal likelihood value in the first beamforming map.

Embodiment 11 the method of any of Embodiments 1-10, further comprising calculating the spatial statistics of the set of beamforming maps.

Embodiment 12 the method of any of Embodiments 1-11, wherein the second set of acoustic measurements is a subset of the first set of acoustic measurements.

Embodiment 13 one or more non-transitory machine-readable media having instructions stored thereon that are executable by a computing device to perform operations comprising based, at least in part, on a first set of acoustic measurements of a borehole, generate a first beamforming map, estimate a first leakage location based, at least in part, on the first beamforming map, based, at least in part, on a second set of acoustic measurements, generate a set of beamforming maps corresponding to a set of acoustic velocities, evaluate spatial statistics of the set of beamforming maps against one or more criteria to identify which of the set of beamforming maps indicates a most prominent leakage location, and update the first estimated leakage location based, at least in part, on the identified beamforming map.

Embodiment 14 the machine-readable media of Embodiment 13 further comprising instructions executable by the computing device to determine an estimated acoustic velocity at the first estimated leakage location as an acoustic velocity in the set of acoustic velocities used to generate the identified beamforming map.

Embodiment 15 the machine-readable media of any of Embodiments 13-14, wherein the instructions executable by the computing device to update the first estimated leakage location comprises instructions to identify a location having a maximal likelihood value in the identified beamforming map, and indicate the location having the maximal likelihood value as an updated estimated leakage location.

Embodiment 16 the machine-readable media of any of Embodiments 13-15, wherein the spatial statistics of the set of beamforming maps comprise spatial second derivatives of likelihood values in the set of beamforming maps, wherein the instructions executable by the computing device to evaluate the spatial statistics against one or more criteria comprise instructions to determine which of the set of beamforming maps has a maximal spatial second derivative.

Embodiment 17 the machine-readable media of any of Embodiments 13-16, wherein the instructions executable by the computing device to update the first estimated leakage location comprise instructions to determine a location having a maximal likelihood value in the identified beamforming map.

Embodiment 18 the machine-readable media of any of Embodiments 13-17, further comprising instructions executable by the computing device to position a hydrophone array tool in the borehole at the first estimated leakage location, and obtain the second set of acoustic measurements with the hydrophone array tool at the first estimated leakage location.

Embodiment 19 an apparatus comprising a hydrophone array, a processor, and a machine-readable medium having program code executable by the processor to cause the apparatus to based, at least in part, on a first set of acoustic measurements of a borehole, generate a first beamforming map, estimate a first leakage location based, at least in part, on the first beamforming map, based, at least in part, on a second set of acoustic measurements, generate a set of beamforming maps corresponding to a set of acoustic velocities, evaluate spatial statistics of the set of beamforming maps against one or more criteria to identify which of the set of beamforming maps indicates a most prominent leakage location, and update the first estimated leakage location based, at least in part, on the identified beamforming map.

Embodiment 20 the apparatus of Embodiment 19, further comprising program code executable by the processor to cause the apparatus to, position the hydrophone array at the first estimated leakage location, and obtain a second set of acoustic measurements from the hydrophone array based, at least in part, on the first estimated leakage location.

What is claimed is:

1. A method comprising:
based, at least in part, on a first set of acoustic measurements of a borehole, generating a first beamforming map;
estimating a first leakage location based, at least in part, on the first beamforming map;
based, at least in part, on a second set of acoustic measurements, generating a set of beamforming maps corresponding to a set of acoustic velocities, each beamforming map of the set of beamforming maps being generated using a different acoustic velocity of the set of acoustic velocities;
evaluating spatial statistics of the set of beamforming maps against one or more criteria to identify which of the set of beamforming maps indicates a most prominent leakage location; and
updating the first estimated leakage location based, at least in part, on the identified beamforming map.

2. The method of claim 1, further comprising determining an estimated acoustic velocity at the first estimated leakage location as an acoustic velocity in the set of acoustic velocities used to generate the identified beamforming map.

3. The method of claim 2, further comprising updating an acoustic velocity profile of the borehole with the estimated acoustic velocity at the first estimated leakage location.

4. The method of claim 1, wherein updating the first estimated leakage location comprises,
identifying a location having a maximal likelihood value in the identified beamforming map; and
indicating the location having the maximal likelihood value as an updated estimated leakage location.

5. The method of claim 1, further comprising determining the set of acoustic velocities based, at least in part, on operational conditions in the borehole.

6. The method of claim 1, wherein the spatial statistics of the set of beamforming maps comprise spatial second derivatives of likelihood values in the set of beamforming maps.

7. The method of claim 6, wherein evaluating the spatial statistics against the one or more criteria comprises determining which of the set of beamforming maps has a maximal spatial second derivative.

8. The method of claim 1, further comprising positioning a hydrophone array tool in the borehole at the first estimated leakage location.

9. The method of claim 8, further comprising obtaining the second set of acoustic measurements with the hydrophone array tool at the first estimated leakage location.

10. The method of claim 1, wherein estimating the first leakage location comprises identifying a location having a maximal likelihood value in the first beamforming map.

11. The method of claim 1, further comprising calculating the spatial statistics of the set of beamforming maps.

12. The method of claim 1, wherein the second set of acoustic measurements is a subset of the first set of acoustic measurements.

13. One or more non-transitory machine-readable media having instructions stored thereon that are executable by a computing device to perform operations comprising:
   based, at least in part, on a first set of acoustic measurements of a borehole, generate a first beamforming map;
   estimate a first leakage location based, at least in part, on the first beamforming map;
   based, at least in part, on a second set of acoustic measurements, generate a set of beamforming maps corresponding to a set of acoustic velocities, each beamforming map of the set of beamforming maps being generated using a different acoustic velocity of the set of acoustic velocities;
   evaluate spatial statistics of the set of beamforming maps against one or more criteria to identify which of the set of beamforming maps indicates a most prominent leakage location; and
   update the first estimated leakage location based, at least in part, on the identified beamforming map.

14. The machine-readable media of claim 13 further comprising instructions executable by the computing device to determine an estimated acoustic velocity at the first estimated leakage location as an acoustic velocity in the set of acoustic velocities used to generate the identified beamforming map.

15. The machine-readable media of claim 13, wherein the instructions executable by the computing device to update the first estimated leakage location comprises instructions to,
   identify a location having a maximal likelihood value in the identified beamforming map; and
   indicate the location having the maximal likelihood value as an updated estimated leakage location.

16. The machine-readable media of claim 13, wherein the spatial statistics of the set of beamforming maps comprise spatial second derivatives of likelihood values in the set of beamforming maps, wherein the instructions executable by the computing device to evaluate the spatial statistics against one or more criteria comprise instructions to determine which of the set of beamforming maps has a maximal spatial second derivative.

17. The machine-readable media of claim 13, wherein the instructions executable by the computing device to update the first estimated leakage location comprise instructions to determine a location having a maximal likelihood value in the identified beamforming map.

18. The machine-readable media of claim 13, further comprising instructions executable by the computing device to,
   position a hydrophone array tool in the borehole at the first estimated leakage location; and
   obtain the second set of acoustic measurements with the hydrophone array tool at the first estimated leakage location.

19. An apparatus comprising:
   a hydrophone array;
   a processor; and
   a machine-readable medium having program code executable by the processor to cause the apparatus to,
      based, at least in part, on a first set of acoustic measurements of a borehole, generate a first beamforming map;
      estimate a first leakage location based, at least in part, on the first beamforming map;
      based, at least in part, on a second set of acoustic measurements, generate a set of beamforming maps corresponding to a set of acoustic velocities, each beamforming map of the set of beamforming maps being generated using a different acoustic velocity of the set of acoustic velocities;
      evaluate spatial statistics of the set of beamforming maps against one or more criteria to identify which of the set of beamforming maps indicates a most prominent leakage location; and
      update the first estimated leakage location based, at least in part, on the identified beamforming map.

20. The apparatus of claim 19, further comprising program code executable by the processor to cause the apparatus to,
   position the hydrophone array at the first estimated leakage location; and
   obtain a second set of acoustic measurements from the hydrophone array based, at least in part, on the first estimated leakage location.

* * * * *